Jan. 27, 1970     M. BROMBERG     3,492,625

GROUNDING DEVICE

Filed March 21, 1968

INVENTOR.
MENASHE BROMBERG

BY David Teshne

ATTORNEY

3,492,625
GROUNDING DEVICE
Menashe Bromberg, West Orange, N.J., assignor to The Thomas & Betts Co., Elizabeth, N.J., a corporation of New Jersey
Filed Mar. 21, 1968, Ser. No. 714,941
Int. Cl. H01r 3/06
U.S. Cl. 339—14                                     8 Claims

ABSTRACT OF THE DISCLOSURE

The disclosure is directed to a grounding device which couples and grounds an electrical raceway and the electrical box to which it is assembled. The grounding device is a bushing with an insulated throat, having spaced on its outer periphery mounting pads. To one pad is applied a grounding lug having a removable lay-in lug for receipt of a grounding conductor therein either assembled to, or apart from the grounding lug. A bonding screw on the grounding lug provides box to bushing grounding and prevents rotation of the bushing together with a set screw through one of the mounting pads.

BACKGROUND OF THE INVENTION

Field of the invention

The invention is directed to the field of grounding electrical raceways and their associated electrical distribution boxes.

Description of the prior art

In prior art devices such as the patent to Curtiss, No. 2,974,185, issued Mar. 7, 1961, a grounding screw is provided on a bushing for the grounding of an electrical wiring system. However, in this arrangement contact between the bushing and the wall of the electrical box is depended upon for the grounding of the electrical box. No positive arrangement is made for an electrical contact between the bushing and the box itself. Further, the grounding of the electrical raceway depends upon the contact between the bushing and the threaded end of the raceway. The use of cutting oils, the accumulation of dirt, oxide coatings, on either the threaded end of the electrical raceway or the bushing, or both, greatly decreases the ability of the device to function for its grounding purposes. In a similar fashion the lay-in type of lug, described with reference to the instant invention, is also known to some degree. However, in most instances it is necessary that the lug be preassembled to the mounting surface, the conductor inserted therein and then the remaining portion of the lug assembled. It is not possible in these devices to place the cable in a portion of the lay-in lug and then assemble it to the remaining portion already premounted upon the object to be grounded.

SUMMARY OF THE INVENTION

The present invention overcomes the difficulties noted above with respect to prior art devices and provides a simple and positive method of grounding both an electrical raceway and the electrical box to which the raceway is coupled. All couplings are made in a positive manner and greatly reduce, or eliminate, the possibility of poor contact due to oxidation, dirt, or roughness of the materials employed. In the invention the ordinary metal bushing, used to couple the raceway to an electrical box, is replaced by one having mounting pads thereon. The first of the mounting pads is employed to receive a set screw such as to lock the bushing to the electrical raceway and prevent relative rotation therebetween. In the second one of the mounting pads there is attached a lug which has provision for receipt of an electrical grounding cable as well as provision for the positive mechanical and electrical connection between the bushing and the electrical box. An additional tab is provided on the lug to prevent relative rotation of the lug with respect to the bushing upon which it is mounted. A bonding screw is provided through one tab of the lug to assure positive electrical and mechanical coupling between the lug and the electrical box and to prevent rotation of the bushing with respect to the electrical box. A final tab of the lug is provided with a pressure screw to be used to couple the grounding connector to the electrical raceway and electrical box. The lug may generally be classified as a lay-in type in that the grounding cable may be layed into the generally U-shaped body portion prior to assembly to the locking portion thereof. The locking portion, as part of the lug itself, may be preassembled to the bushing without interference between the coupling of the grounding connector thereto. A pressure screw in the third tab of the lug is positioned so that the body portion of the lug may be slipped from the third tab and the cable may be inserted therein. The body portion may then be reassembled to the third tab and the pressure screw tightened to couple the grounding cable to the lug and to prevent its disassembly.

It is therefore an object of this invention to provide an improved form of grounding device which provides positive electrical grounding between the components of an electrical wiring system.

It is another object of this invention to provide a grounding device for grounding the bushing employed with an electrical raceway which also provides for the positive grounding of an electrical box with which such bushing is employed.

It is still another object of this invention to provide a grounding device for electrical raceways and electrical boxes having a lug which may be disassembled and a portion of it retained with the bushing while the remaining portion is removed for the easy insertion of a grounding cable thereto. The reassembly of the lug may then be accomplished without disturbing either the grounding cable or the lug itself.

It is yet another object of this invention to provide a grounding device for electrical raceways and electrical boxes which can be assembled to the raceway either before or after the raceway has been coupled to the box.

It is still another object of this invention to provide a grounding device for electrical raceway and electrical boxes which assures unity of the coupling and prevents relative rotation of the component parts with respect to other members of the wiring system.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWING

Similar elements are given similar reference characters in each of the respective figures.

DESCRIPTION OF THE PREFERRED EMBODIMENT

Figure 1:
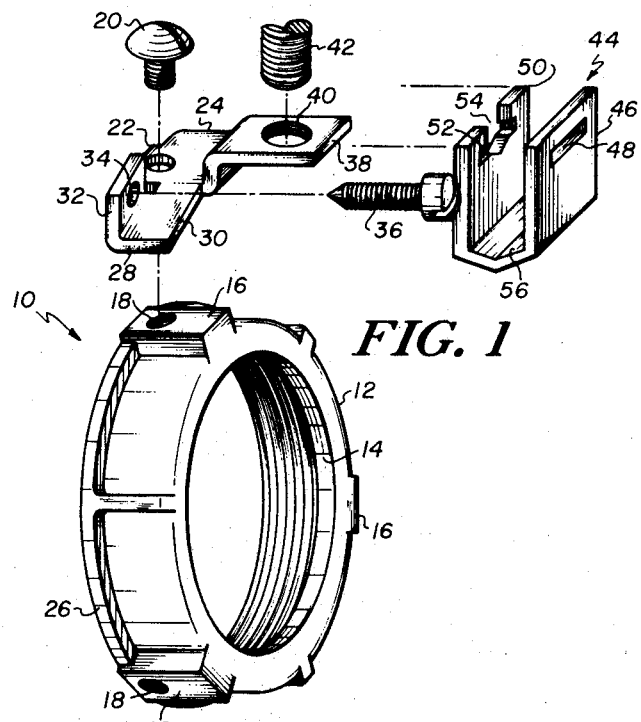
FIG. 1 is an exploded view of the component portions which make up a grounding device constructed in accordance with the concepts of the invention.

Turning now to FIG. 1 there is shown an exploded view of a grounding device 10 constructed in accordance with the concepts of the invention. The grounding device 10 is made up of a metal bushing 12 provided with an insulated throat 14. Insulated throat 14 will provide protection for conductors placed within the electrical raceway to which the bushing will be coupled and permit the entrance of the conductors without damage into the electrical box with which the raceway is associated. If desired, insulated throat 14 may be omitted. Mounted at approximately 120° intervals, along the outer periphery of the bushing 12, are mounting pads 16. The mounting pads 16 are provided with threaded apertures 18 for the receipt therein of either set screws such as set screw 19 or for the receipt of assembly screws 20. Although three mounting pads 16 are shown, as many mounting pads as are desired may be formed upon bushing 12. Assembly screws 20 are employed to fasten the lug 22 to one of the mounting pads 16 of the bushing 12. The set screw 19 is employed to prevent rotation of the bushing 12 with respect to an electrical conduit such as 60 in FIG. 4.

Lug 22 has a first tab 24 (see FIG. 3) which is downwardly turned and will engage the rib 26 at the rear of the bushing 12 and prevent relative rotation of the lug 22 with respect to the bushing 12. A second tab 28 has a first portion extending outwardly from the main body of the lug 22 and a second portion 32 extending generally in a plane perpendicular to the main body of the lug 22. Portion 32 of tab 28 has a threaded aperture 34 for receipt therein of a bonding screw 36. Aperture 34 is so positioned that bonding screw 36 will not engage bushing 12 or any locknut positioned between bushing 12 and the electrical box. As will be described below with respect to FIG. 4, bonding screw 36 will be tightened against the wall of an electrical box to provide good electrical contact between the electrical box and the lug 22 and thus the bushing 12 as well as prevent rotation of the bushing ring 12 with respect to the wall of the electrical box. Bonding screw 36 is made long enough to contact the electrical box wall despite the use of locknuts, spacers, or insulators between bushing 12 and the box wall. Lug 22 has a third tab 38 which is also provided with a threaded aperture 40. Aperture 40 will receive a threaded pressure screw 42. The generally U-shaped body 44 when assembled to the tab 38 of the lug 22 will form a receptacle for receiving a grounding cable and for securely fastening the grounding cable to the lug 22.

U-shaped body 44 has a first arm 46 in which is placed an aperture 48 of sufficient size to receive tab 38 of lug 22. A second leg 50, is provided with a slot 52 of similar size and placement to that of slot 48. In addition, a further slot 54 is provided which communicates with the slot 52. The slot 54 is not as long as the slot 52 and is proportioned so that it may pass about the pressure screw 42 during assembly. In order to assemble the U-body 44 to the tab 38, pressure screw 42 must be advanced to a position where only a small portion of the thread extends below the tab 38. It must not extend so far down as to interfere with the position of leg 50 below the slot 52. The U-body 44 may then be slipped over the tab 38 and the slot 54 together with the slot 52 will permit the passage of the leg 50 beyond the pressure screw 42. Tab 38 will then be made to enter slot 48. Pressure screw 42 will now tighten to prevent disassembly of the U-body 44 from the tab 38. It is possible to insert the grounding cable within the U-body 44 prior to its being slipped over the tab 38 or in the alternative the grounding conductor, or grounding cable, may be inserted within the U-body 44 after it has been positioned on the tab 38 but before the pressure screw 42 has been completely tightened. The U-body 44 is provided with a small radius curve or a shallow V-shaped bight as at 56 in its bottom portion in order to increase the holding power of the pressure screw with the assembled grounding cable. Further, the bottom of the pressure screw although shown to be flat may be made curved or may be provided with a saddle if it is desired to increase the holding power of the lug 22.

Figure 2:
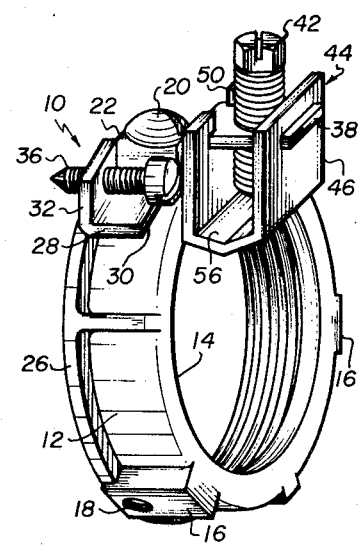
FIG. 2 is a prospective side view of the grounding device constructed in accordance with the concepts of the invention and showing the component parts of FIG. 1 assembled.

As is shown in FIG. 2, lug 22 has been assembled to the bushing 12 by means of the screw 20 and the bonding screw 36 has been positioned within the aperture 34 of the portion 32. The U-body 44 has been positioned on the tab 38 and the pressure screw 42 has been advanced so as to capture U-body 44 and prevent its disassembly from the tab 38.

Figure 3:
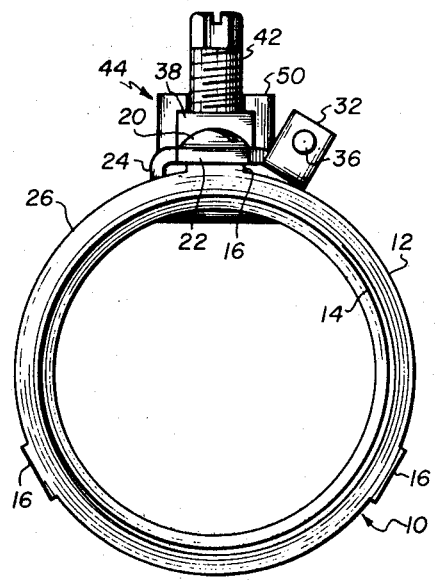
FIG. 3 is a rear elevation of the assembled grounding device of FIG. 2.

FIG. 3 shows in more detail the tab 24 of lug 22 which is downturned to engage with the rib 26 of the bushing 12 thus preventing the rotation of the lug 22 with respect to the bushing 12, in a counterclockwise direction (looking down on pressure screw 42 in FIG. 3). The bonding screw 36, tightened against the electrical box will prevent rotation in the clockwise direction.

Figure 4:
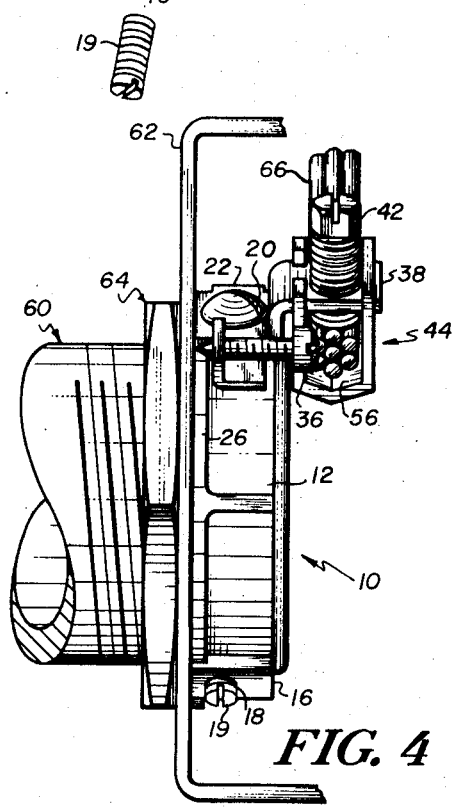
FIG. 4 is a side elevation showing the assembly of an electrical raceway to an electrical box with the grounding device of the invention in place.

Turning now to FIG. 4, there is shown a typical assembly of an electrical raceway coupled to the wall of an electrical box 62. Raceway 60, having a nut 64 positioned upon the threaded portion thereof, is positioned through a knockout in the wall of the electrical box 62. The raceway 60 is coupled to the electrical box 62 by means of a bushing 12. The bushing 12 is employed to securely fasten the electrical raceway 60 to the electrical box 62. The lug 22 may be positioned upon the bushing 12 prior to the installation of the bushing 12 to the threaded end of the electrical raceway 60 or it may be placed there after installation of the bushing to the raceway. In this instance, any one of the three mounting pads 16 may be employed according to which position is most accessible and best suits the particular installation. A set screw 19 is then inserted into one of the two remaining mounting pads 16 to couple the bushing 12 to the electrical raceway 60 and to prevent relative movement. In the particular installation shown, it is assumed that the end of the grounding cable 66 is employed for this particular electrical box 62 and electrical raceway 60. In this instance the U-body 44 may be preassembled to the tab 38 and its assembly will be preserved by a slight tightening of the pressure screw 42 such that it will prevent the removal of the U-body 44 from the tab 38. The stripped end of the grounding cable 66 will then be inserted within the U-body 44 and the pressure screw 42 tightened to assure a good mechanical and electrical coupling therebetween. In the event that the installation was merely one of a number of such installations using the same grounding cable, then a portion of the cable 66 somewhere mid-span could be stripped of its outer insulating cover and this uninsulated portion would be laid into the U-body 44 which had been removed by properly positioning the pressure screw 42. The U-body 44, together with the grounding cable 46 would then be slid into position with respect to the tab 38 and the pressure screw 42 tightened to insure a good mechanical and electrical connection therebetween.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A grounding device for assembled electrical raceways and electrical boxes comprising: a threaded bushing arranged to engage the threaded end of an electrical raceway and secure the same to the wall of an electrical box; a lug coupled to said bushing; said lug having a first tab;

said first tab having a threaded aperture to receive therein a pressure fastener; a threaded pressure fastener engageable with the threaded aperture of said first tab and positionable with respect to said first tab; a generally U-shaped ground cable receiving body terminating in first and second legs; an aperture in said first leg for receipt therein of said first tab; a first slot in said second leg for receipt therein of said first tab; and a second slot in said second leg, communicating with a portion of said first slot; said second slot being proportioned to permit the passage of said second leg above said first tab and past said pressure fastener, when said pressure fastener is positioned with repect to said first tab less than a predetermined amount whereby a grounding cable may be positioned in said ground cable receiving body when detached from said first tab and said body together with said cable may be positioned upon said first tab, said pressure fastener being repositioned to securely engage said cable and prevent disassembly of said body from said first tab.

2. A ground device as defined in claim 1, wherein said lug further comprises a second tab; said second tab having a threaded aperture to receive therein a bonding pin, and a threaded bonding pin engageable with the threaded aperture of said second tab and positionable with respect to said second tab; said bonding pin being positioned to engage said electrical box to provide an electrical contact between said bushing and said electrical box and a mechanical contact therebetween to prevent relative rotation between said bushing and said electrical box.

3. A grounding device as defined in claim 1, wherein said lug further comprises a second tab; said second tab having a downturned end to engage said bushing to prevent said plug from rotating with respect to said bushing.

4. A grounding device as defined in claim 2, wherein said lug further comprises a third tab; said third tab having a downturned end to engage said bushing to prevent said lug from rotating with respect to said bushing.

5. A grounding device as defined in claim 1, wherein said bushing comprises a plurality of mounting pads on the outer periphery of said bushing; each of said mounting pads having a threaded aperture therein to permit the coupling of said lug to said bushing.

6. A grounding device as defined in claim 1, wherein said bushing comprises three mounting pads mounted equidistant about the periphery of said bushing; each of said mounting pads having a threaded aperture therein to permit the coupling of said lug to said bushing; a fastener for fastening said lug to a first one of said mounting pads; and a set screw engageable with the threaded aperture in a second one of said mounting pads whereby said set screw may be tightened against said electrical raceway to prevent relative rotation between said raceway and said bushing.

7. A grounding device as defined in claim 1, further comprising an insulated throat positioned with respect to said bushing and held in position upon the engagement of said bushing with said electrical raceway whereby conductors passed through said raceway to said electrical box are protected.

8. A grounding device as defined in claim 1, wherein said generally U-shaped ground cable receiving body has a shallow V-shaped bight at the base to increase the holding power of said grounding cable by said body.

References Cited

UNITED STATES PATENTS

| | | | |
|---|---|---|---|
| 1,974,910 | 9/1934 | Bondeson | 174—51 |
| 2,974,185 | 3/1961 | Curtiss. | |
| 3,027,533 | 3/1962 | Monson. | |

FOREIGN PATENTS 831,273  2/1952  Germany.

MARVIN A. CHAMPION, Primary Examiner

PATRICK A. CLIFFORD, Assistant Examiner

U.S. Cl. X.R.

174—51; 339—272